United States Patent

[11] 3,564,126

[72] Inventors Richard F. Koch
Cuyahoga Falls;
Ermal E. Penix; John R. Shoemaker,
Akron; Harry O. Pfeiffer; Richard H.
Smith, North Canton, Ohio
[21] Appl. No. 580,273
[22] Filed Sept. 19, 1966
[45] Patented Feb. 16, 1971
[73] Assignee Goodyear Aerospace Corporation
Akron, Ohio

[54] ELECTRONIC WRITE IN AND IMAGE ROTATION CONTROL IN AN ELECTRONIC IMAGE CORRELATOR TUBE
6 Claims, 9 Drawing Figs.

[52] U.S. Cl. .......... 178/6, 178/6.8
[51] Int. Cl. .......... H04n 3/10
[50] Field of Search .......... 315/11, 12; 343/(SMM), 5 (CM); 178/6.8, 6

[56] References Cited

UNITED STATES PATENTS

| | | | |
|---|---|---|---|
| 2,875,371 | 2/1959 | Perkins | 315/11 |
| 3,189,781 | 6/1965 | Lempert | 315/11 |
| 3,290,546 | 12/1966 | Link et al | 315/11 |
| 3,290,674 | 12/1966 | Calhoon | 315/12 |
| 3,413,515 | 11/1968 | Haring | 178/6.8 |

*Primary Examiner*—Robert L. Griffin
*Assistant Examiner*—Barry L. Leibowitz
*Attorney*—J. G. Pere

ABSTRACT: An electronic image correlation tube utilizing a partial grid modulated by video drive signal to write in electronic information for storage from a constant beam light source. The capability of also writing in optical input information by conventional means is incorporated. Correlation is achieved by a conventional means, but image rotation control is provided within the tube, together with a unique reference establishment between the input and stored information to facilitate correlation. Fiber optics may also be utilized between the reference and the photo cathode to assist in providing more resolution to the input information.

PATENTED FEB 16 1971 3,564,126

INVENTORS
RICHARD F. KOCH
ERMAL E. PENIX
HARRY O. PFEIFFER
JOHN R. SHOEMAKER
RICHARD H. SMITH
BY: Oldham & Oldham
ATTORNEYS

ELECTRONIC WRITE IN AND IMAGE ROTATION CONTROL IN AN ELECTRONIC IMAGE CORRELATOR TUBE

This invention relates to an electronic image correlation tube which provides for an electrical image write in characteristic, together with image rotation control features to enhance the reference and correlation techniques.

Heretofore it is well known that an electronic image tube might be used for a correlation technique, as particularly pointed out in patent application Ser. No. 232,961, filed Oct. 25, 1962 (now U.S. Pat. No. 3,290,546) for "Electron Image Correlator", and assigned to Goodyear Aerospace Corporation. A subsequent patent application Ser. No. 424,439 filed Jan. 8, 1965 (now U.S. Pat. No. 3,424,937) and entitled "Electron Image Correlator Tube" claims some improvements over the application Ser. No. 232,961. However, both these applications require the image information to be optical so that it might appropriately be converted to electronic image information in the tube itself by use of the well-known photoemissive cathode technique. Thus, the subject matter of these patent applications requires extraneous means to provide the necessary optical input information therefore making the equipment more burdensome, complex, and expensive. Further, these prior applications do not provide an efficient means to reference the images within the tube, and thus external circuitry must be utilized to establish reference points. Inclusion in an electronic image tube of means to achieve these deficiencies would be of benefit to the art.

Therefore, it is the general object of the present invention to overcome the deficiencies of the prior art in electron image tubes alone or adapted for correlation techniques, by the provision of means to electronically write or transfer image information to the storage grid without any external optical input medium, and to incorporate reference points within the tube itself, as well as means to achieve angular rotation of the reference points to compensate for any angular errors in the pickup equipment providing the video electronic input information.

Another object of the invention is to provide an electronic image correlation tube wherein a constant input light source may be modulated with a video drive signal at any of a number of points within the tube as the write in for storage on the grid is achieved essentially by a suitable scanning techniques whereby each increment of the storage mesh is charged with electrons emitted from the photo cathode and particularly modulated before they arrive to charge each specific increment of the storage grid.

A further object of the invention is to allow a common reference point because of an electronic write in technique whereby automatic centering is accomplished without the requirement for a separate external centering loop.

A further object of the invention is to provide an electron image correlation tube wherein an electron may be projected and nutated onto an image stored on the storage grid and also may be rotated during the nutation phase to achieve reference alignment with the image stored on the grid thereby eliminating the necessity for outside reference rotation technique.

A further object of the invention is to provide a greater versatility, reduction of equipment, lower cost, and simplified operation of an electronic image correlation tube.

The aforesaid objects of the invention and other objects which will become apparent are achieved by providing in combination an enclosed tubular shape housing drawn to a vacuum, a photoemissive cathode at one end of the housing to convert light images into electronic images by the emission of electrons from the cathode, a storage grid positioned in spaced parallel relation to the cathode inside the housing adapted to receive the impingement of the electrons emitted from the cathode to effect a resultant charge over the grid thereby representing the light images electronically, means to place a constant and uniform light image on the cathode, means to modulate the electrons emitted from the cathode with a video drive signal to control the number of electrons passing to the storage grid, and means to controllably scan the path of electrons passing from the cathode of the storage grid in coordination with the video drive signal whereby the video drive signal is stored on the storage grid, and means to controllably rotate the path of electrons emitted from the cathode and passing to the storage grid.

For a better understanding of the invention reference should be had to the accompanying drawings, wherein.

The art of image correlation generally involves providing a reference image of a certain object, for example a particular section of the earth's terrain. Then a subsequent image of the same area of the terrain, hereinafter called the present image, is matched or correlated with the reference image. Utilizing this technique, for example, an unmanned aircraft can fly a predetermined flight path governed by previously prepared reference image information when image correlation is used to determine error signals to correct the flight path of the aircraft.

Figure 1:
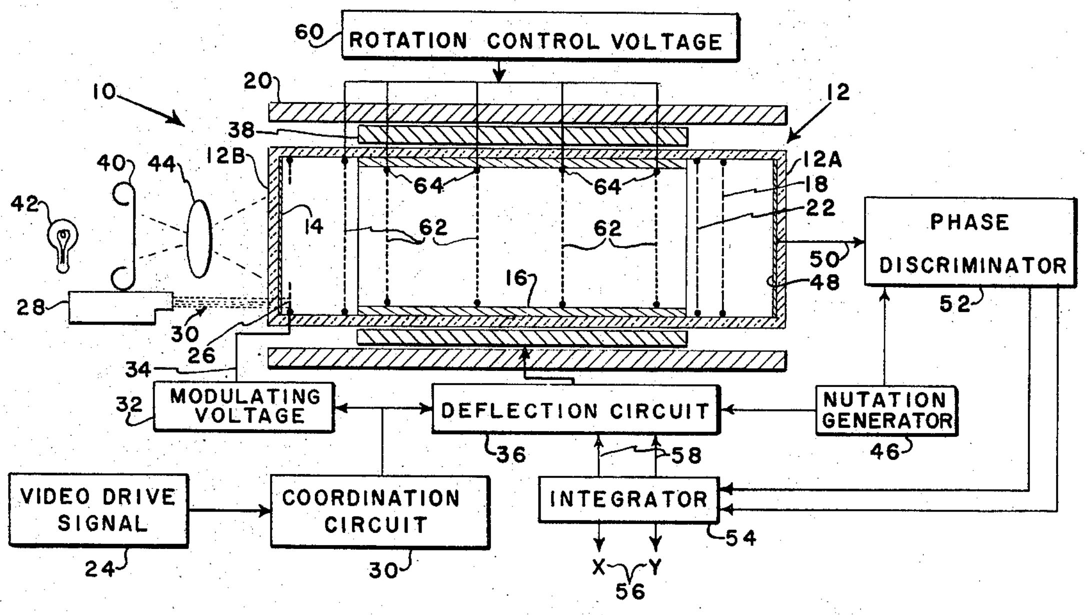
FIG. 1 is a schematic block diagram illustrating an electronic image correlation tube representing a preferred embodiment of the invention.

With reference to the form of the invention illustrated in FIG. 1 of the drawings, there is shown an image-matching system which is indicated generally by numeral 10. The basic element in this system is an electronic image correlation tube, indicated generally by numeral 12. The correlation tube 12 comprises a housing 12A transparent on an end 12B with a photocathode 14 positioned on the inside of end 12B. In the usual manner the cathode 14 is adapted to convert light energy impinging thereon into an electronic image to be accelerated for storage on a storage grid 18 by a voltage impressed on an accelerating electrode 16 extending between the photocathode 14 and the storage grid 18. A permanent or electromagnetic coil or solenoid 20 is used to achieve a focus of the image onto the storage grid 18. This coil 20 may consist of a number of adjacent individual elements to allow the currents causing the magnetic fields of each to be individually adjusted. In this manner the required divergence or convergence of the magnetic focus fields can be selectively controlled to control the image rotation, as more fully explained hereinafter. The grid 18 is positioned substantially parallel to the photo cathode 14, but spaced therefrom. A secondary emission or collecting screen 22 is provided in close spaced adjacent relationship to the storage grid 18 to collect the electrons that are emitted from the grid 18 as a result of secondary emission during the writing of a charge pattern for storage onto the grid 18.

It should be understood however that the tube of the invention can be used to generate a television type video signal by operation as a flying spot scanner or an image dissector.

In the flying spot scanner mode, an image is stored directly on the grid 18, as seen in FIG. 1, in the usual manner as set forth in the above-identified patent applications. Then a small area spot of the photocathode 14 is illuminated. The photoelectrons emitted from this spot are scanned over the grid 18 which effectively modulates the beam. The modulated beam may be amplified by electron multipliers before being converted to an electrical or an optical video output signal. In other words, this technique is similar to a conventional flying spot scanner using a cathode ray tube, a transparency, and a photomultiplier.

In the image dissector mode, a spot of the photocathode 14 is illuminated and stored on the grid 18. Then the photoelectron image is scanned over the electrical aperture. The signal passing through the aperture may be amplified and picked off as the video output signal. Thus, by use of the electric aperture on the grid 18, an image dissector mode is possible. Of course, a permanent aperture could be fabricated in the grid by cutting a hole or making an area with no dielectric. Normal correlation could still be achieved even with the permanent hole blocking out some of each image.

Figure 3:
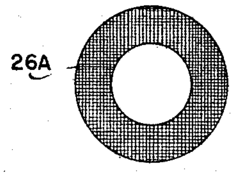
FIG. 3 is a plan view of one embodiment of a modulating screen which might be utilized in the correlation tube of FIG. 1.
Figure 4:
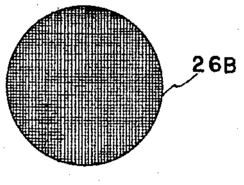
FIG. 4 is a plan view of another modification of a modulating screen which might be used in the correlation tube of FIG. 1.

The invention herein contemplates storage of a video drive signal 24 directly onto the storage grid 18 to thereby eliminate the necessity for displaying the video on a cathode ray tube having a long persistance phosphor so such optical signal could be appropriately presented as an optical image and converted into an electronic signal in the correlation tube. In order to achieve the storage of the video drive signal 24 directly, a modulating mesh or aperture plate 26 is mounted to the tube 12 in close spaced adjacent parallel relationship to the photocathode 14. In essence, the modulating screen covers only a small area adjacent the periphery of the cathode 14 and may be shaped like a washer 26A, as indicated in FIG. 3, or as a conventional screen mesh 26B as indicated in FIG. 4. Nevertheless, the purpose of the modulating screen 26 is to pass electrons in a controllable manner depending upon the voltage applied to the mesh 26.

Naturally, the electrons emitted from the photocathode 14 must be emitted in the area adjacent the modulating screen 26 in order for such modulation to take place. Therefore, in order to provide this effect, a spotlight 28 is adapted to direct a small substantially pointed light beam, indicated by dotted lines 30, onto the photocathode 14 in an area immediately adjacent and substantially centrally aligned with the particular modulating screen 26. Then, the video drive signal 24 passes through a coordinating circuit 31 to provide a modulating voltage 32 which controllably drives the modulating screen 26 through line 34 as indicated. In order to then achieve a stored image on the grid 18, the small stream of electrons passing through the modulating screen 26 because of the light 30 impinging thereupon, must be deflected or scanned in a suitable manner, similar to the raster in a normal television application, so as to appropriately define the particular image on the grid 18. To this end, specific deflection circuitry 36 is also connected through the coordination circuit 31 to drive a deflection yoke 38 surrounding the tube 12 between the photocathode 14 and the grid 18.

The invention contemplates that image writing with the video drive signal 24 onto the storage grid 18 will take less than about one second so that the light 30 need not be on the same spot for an extended period of time so as to cause possible deterioration or damage to that particular point area on the photocathode 14. However, it should be understood that the circuit 31 coordinates the signal drive to the modulating voltage 32 and the deflection circuit 36 so as to insure the proper scanning movement of the modulated electron stream to provide desired image information stored on the grid 18. The number of electrons impinging on the grid 18 determine through secondary emission the increment charge thereon, with the distribution of charges over the surface thereof representing electronically the video drive signal 24.

Then, to obtain a correlation in the well-known manner, a reference film 40 having a reference image similar to that stored by the video drive signal 24 is backlighted by bulb 42 and focused onto the open portion of the photocathode 14 by a lens 44 with nutation then provided by a nutation generator 46 operating through the deflection circuitry 36 to in essence nutate the entire image of the reference film 40 focused onto the photocathode 14, all in the well-known manner and as set forth in the above-identified patent applications. Naturally, correlation is recognized by picking up an output signal from an anode 48 which is in substantially spaced parallel relation to the grid 18 and at the opposite end of the tube 12 from the photocathode 14. Such signal may normally be an electrical voltage or current detecting the number of electrons passing through the grid 18 because of the nutation, with correlation or match being detected by a maximum voltage or current representing the maximum number of electrons passing through the grid 18. This signal detected by the anode 48 is fed through a wire 50 into a phase discriminator 52 which is also driven by the nutation generator 46 for proper coordination, with the particular signals from the phase discriminator 52 sent to an integrator 54 where X and Y error signals are generated showing the mismatch between the present video drive signal 24 stored on the grid 18 and the reference image from the film 40. Naturally, in the usual manner, the integrator 54 also feeds the deflection circuitry 36 through suitable lines 58 so as to properly bring about the lock on or continued match correlation of the particular images.

It is well known in this art that the magnetic fields created by the focus coil 20 and the electrostatic field created between tube elements if not parallel to the axis tend particularly at the ends thereof to cause angular rotation of the particular image being directed as an electron stream through the tube for matching with the image stored on the grid 18. Therefore, to avoid this image rotation as well as to correct possible angular system errors inherent in the video drive signal 24, or the image information stored on the reference film 40, a particular rotation control voltage 60 is provided in association with one or more rotation control meshes, each indicated by numeral 62 to series control the acceleration of the electrons as they pass from the photocathode 14 down the tube 12 under the influence of the accelerating electrode 16. These meshes 62 effectively control the relationship parallel to the axis of tube 12 between the magnetic and electrostatic fields thus controlling the rotative effect. It should be understood that the meshes 62 are only effective to control image rotation when there is a convergence or divergence of the magnetic fields therebetween as produced by the focus coil 20, either as a single coil or by s segmented coil.

Usually the meshes 62 will be adjusted through the rotation control voltage 60 to normally allow the electrons representing image formation to move with no rotation down the tube. However, it has been found by increasing or decreasing the voltage slightly, that the paths of electrons will be rotated slightly clockwise or counterclockwise dependent upon the direction of voltage change and the direction of the magnetic field. In actual testing of mesh of this type, it has been found important that they be insulated from the accelerating electrode 16, as by mounting rings 64, and that actual angular rotation of the full reference image of between about 1 to about 5° is conveniently possible. Naturally, such internal electronic rotation of the image eliminates the necessity for external normally mechanical means rotating the entire tube 12 about its longitudinally central axis. It should be understood that the amount of angular rotation is dependent on the number of meshes utilized in combination with the amount of voltage change and the degree of convergence or divergence of the magnetic field. The rotation change tends to add in series between each set of meshes.

Figure 5:
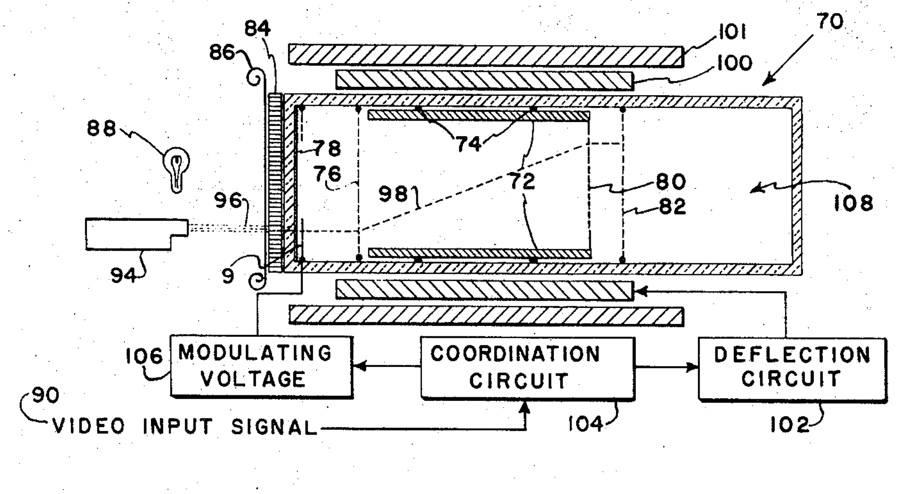
FIG. 5 is a schematic block diagram of a slightly modified form of correlation tube utilizing the modulation features to provide an electrical video input signal to be stored on the storage grid.

FIG. 5 represents a slightly modified embodiment of the invention wherein a correlation tube indicated generally by numeral 70 has an internally mounted drift tube 72 concentrically aligned and mounted therein by insulating rings 74. The drift tube 72 has field mesh 76 mounted to but electrically insulated from one end thereof adjacent a photocathode 78 while a collector mesh 80 is mounted and electrically attached at the other end thereof. A storage mesh 82 is mounted in spaced parallel adjacent relationship to the collector mesh 80. Suitable and well known fiber optics 84 are mounted adjacent that photocathode end of the tube 70 for receiving in face to face relationship a reference film 86 backlighted by suitable light means 88. Normally the electrons emitted from the photocathode 78 are accelerated until they enter the drift tube 72. But while in the drift tube 72 their velocity remains essentially constant so they may be deflected with more precision as more fully explained hereinafter.

Again, in order to write image information on the storage grid 82 by means of a suitable video input signal 90, a modulating grid 92 is mounted in close spaced adjacent relationship to the photocathode 78. A light source 94 feeds a small, confined, generally substantially circular beam of light 96 onto the photocathode 78 so that the electrons emitted from the photocathode must pass through the modulating grid 92. Such passage is indicated by a dotted line 98, which shows deflection through the area of the drift tube 72 by means of a suitable deflection yoke 100. The drive current to the deflection yoke 100 is provided by a deflection circuit 102 fed through a coordination circuit 104. A focus coil 101 serves the purpose of selectively deflecting the magnetic field passing down the tube 20. Naturally, the modulating grid 92 is driven by a modulating voltage 106 also controlled by the coordinating circuit 104, which circuit 104 receives the video input signal 90 to effect mutual coordination between the modulating voltage 106 and the deflection circuit 102. Therefore, the electron beam 98 is properly modulated as it passes through the grid 92 to insure that a suitable scan-type painting on the storage grid 82 will in essence provide a charge pattern through secondary emission to accurately represent the image carried by the video input signal 90. A suitable output section, indicated generally by numeral 108 is appropriately provided to readout the image information stored on the grid 82, in generally the same manner usual in the art.

It should be understood that the modulating grid 92 in essence controls the number of electrons which will pass into the stream 98. It appears that this form of modulation of the stream 98 is most suitable since very low modulating voltages may be utilized. For example, voltages of less than about 5v. will appropriately provide the required modulation in this region. Whereas, it should be understood that the field mesh 76, or the collector mesh 80, or even in fact the storage grid 82 might be appropriately modulated to achieve the same results. However, the modulating voltages required for these particular grids or meshes is much higher to achieve the resultant storage, and hence it greatly increases the cost of operating the tube, as well as the voltage control circuitry. Therefore, it appears that the modulating grid spaced in close parallel adjacent relationship to the photocathode will be the most economical structure to achieve the objects of the invention.

Figure 2:
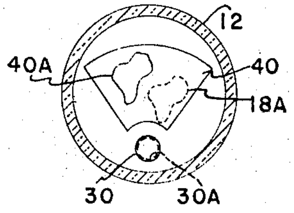
FIG. 2 is an end view of the tube of FIG. 1 looking at the cathode illustrating the center matching technique for providing reference available with this embodiment of the invention.

A unique result occurring from the utilization of the modulating mesh or screen as shown in FIGS. 1 and 5, is that a reference can immediately be established. Such locating reference is shown in FIG. 2 wherein the face of the correlation tube 12 of FIG. 1 is illustrated in plan. The read in beam 30 is indicated by dotted line while the image stored on grid 18 is indicated by dotted lines 18A. An image 40A on the reference film 40 represents the same image as present image 18A stored on grid 18, but as clearly seen, they are not in alignment. However, since the well-known plan position indicator type display is utilized on the storage grid 18, as well as the reference image 40, the reference image 40 can be provided with a concentric reference spot 30A which will normally align with the light beam 30. Therefore, when the images 40A and 18A are properly aligned, the misalignment can readily be measured by comparing the offset relationship of the spot 30A with reference to the normal position of the light beam 30. In this manner, it should be understood that initial reference points are provided when the reference film is compared with the write in light beam 30 to thus eliminate the usual centering loops associated with correlation techniques.

Thus, it is seen that the objects of the invention have been achieved by providing a correlation tube substantially similar to those set forth in the above-identified patent applications, but which incorporates specific structural distinctions to achieve a direct read in of a video input signal thereby eliminating the need for separate optical systems to visually present video information. Further, the system incorporates structural image rotation features to eliminate angular rotation of the reference image during the correlation process. And lastly, reference points are provided to determine errors during the correlation process without the use of separate centering loop circuitry.

While in accordance with the Patent Statutes only one best known embodiment of the invention has been illustrated and described in detail, it is to be particularly understood that the invention is not limited thereto or thereby, but that the inventive scope is defined in the appended claims.

We claim:

1. In combination:

an enclosed housing drawn to a vacuum;

a photoemissive cathode at one end of the housing to convert light images into electronic images by the emission of electrons from the cathode;

a storage grid positioned in spaced parallel relation to the cathode inside the housing adapted when under no charge to receive the impingement of electrons to thereby effect a charge thereon to represent the light images electronically;

means to place a constant and uniform light image on a predetermined point of the cathode;

means associated only with the predetermined point of the cathode to modulate the electrons emitted from the cathode with a video drive signal to control the number of electrons passing to the storage grid;

means to direct the path of electrons emitted from the cathode to the storage grid in coordination with the video drive signal whereby the video drive signal may be stored onto the storage grid when the grid is neutralized;

means to place an optical image onto the cathode;

means to direct the electrons emitted from the cathode representing the optical image onto the storage grid whereby the optical image may be stored onto the storage grid when the grid is neutralized;

means to nutate the electrons representing the optical image when the video drive signal is stored on the storage grid whereby the number of electrons passing through the storage grid represents the correlation function between the optical image and the video drive signal; and means to detect the number of electrons passing through the storage grid during the nutation of the optical image to produce a signal representing the correlation function.

2. In combination:

an enclosed housing drawn to a vacuum;

a photoemissive light responsive cathode at one end of the housing to convert light images into electronic images by the emission of electrons from the cathode;

a storage grid positioned in space parallel relation to the cathode inside the housing and nearer to the other end of the housing than to the cathode adapted when under no charge to receive the impingement of electrons to thereby effect a charge thereon to represent the light images electronically;

means to place a constant and uniform light image at a selected location adjacent the edge of the cathode;

a partial grid positioned adjacent the cathode and covering a portion thereof aligned with the selected light image location of the cathode, means to control the partial grid potential to modulate the electrons emitted from the cathode by the uniform light image with a video drive signal to control the number of electrons passing to the storage grid;

means to direct the path of electrons passing from the cathode to the storage grid caused by the uniform light image in coordination with the video drive signal whereby the video drive signal is stored onto the storage grid;

means to direct an optical image onto the cathode on that portion thereof not covered by the partial grid; and means to focus the electrons emitted from the cathode by the optical image down the housing onto the storage grid.

3. A combination according to claim 2 including a plurality of mesh means positioned in insulated relation to the housing at substantially equal spacing to each other over the majority of the distance between the cathode and the storage grid with means to control the voltages thereon to series control the acceleration of the electrons down the housing whereby the angular relation of the electrons representing the optical image can be rotated electronically by controllably adjusting the voltage on the mesh means.

4. A combination according to claim 2 which includes means to effect nutation of the electrons representing an optical image as they pass to the storage grid when reference image is stored on the storage grid.

5. A correlator tube according to claim 4 which includes an electron collecting anode at the end of the housing opposite the cathode, a coordination circuit to control the voltage potential of the partial grid to allow storage of the uniform light image on the storage grid, and means to compare a reference spot on the optical image of the same size and location which the uniform light image has to the cathode with the stored image on the storage grid to establish electronically the errors present therebetween as determined by the number of electrons detected by the anode.

6. A correlator tube according to claim 2 which includes fiber optics mounted adjacent the cathode, a reference film positioned adjacent the fiber optics, means to backlight the reference film, and means to project a small confined, generally substantially circular beam of light adjacent the peripheral edge of the fiber optics to cooperate with the partial grid inside the housing.